March 15, 1932.  A. J. WEATHERHEAD, JR  1,849,603
METHOD OF MAKING JETS OR NOZZLES
Filed March 19, 1929
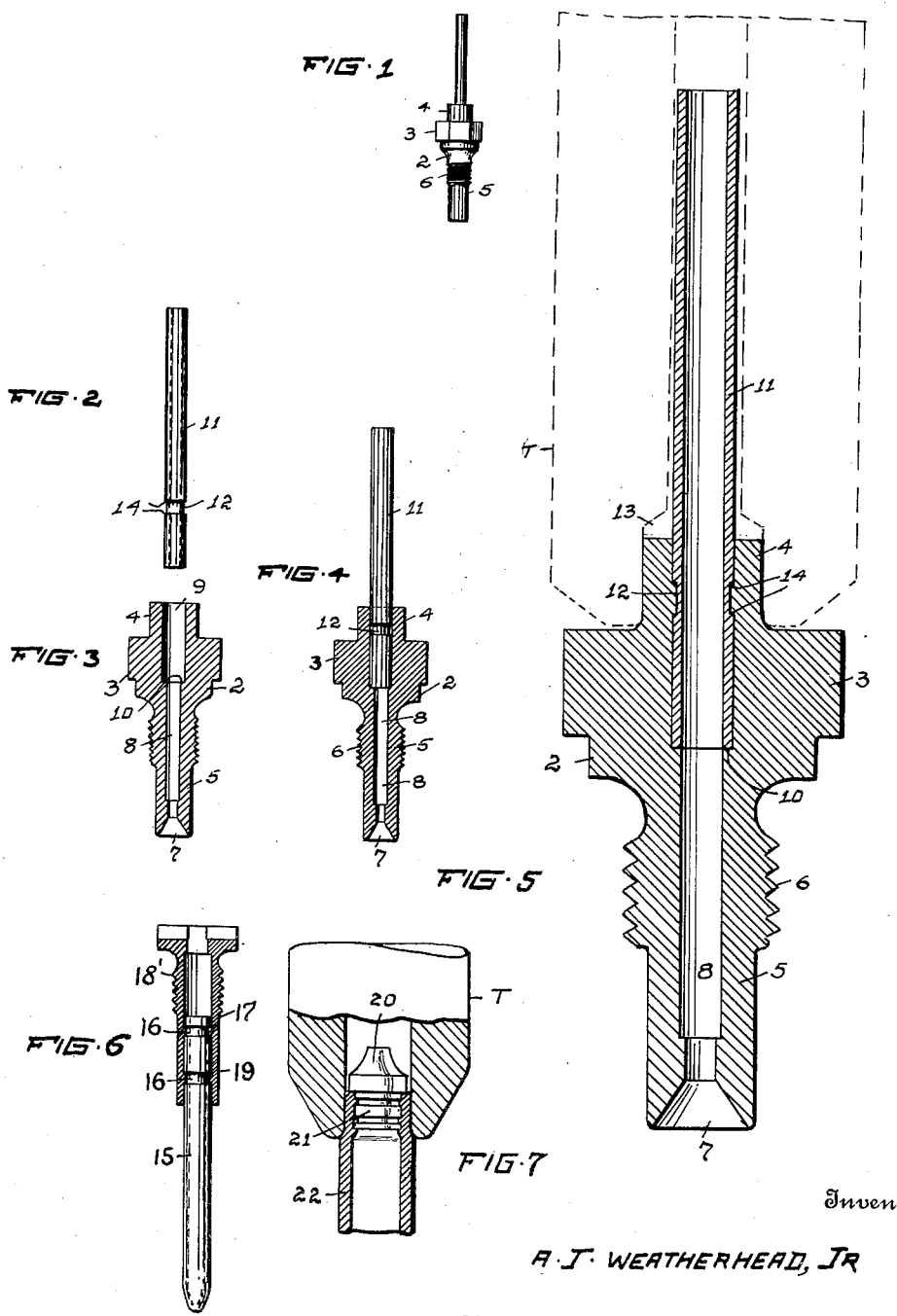
Inventor
A. J. WEATHERHEAD, JR
By Fisher, Moser & Moore
Attorney Patented Mar. 15, 1932

1,849,603

UNITED STATES PATENT OFFICE

ALBERT J. WEATHERHEAD, JR., OF CLEVELAND, OHIO

METHOD OF MAKING JETS OR NOZZLES

Application filed March 19, 1929. Serial No. 348,295.

My invention relates to an improvement in tubular jets or nozzles for carburetors, and a method of producing the same, the object in general being to produce a small jet or nozzle in two pieces or parts, rapidly and cheaply, without welding or soldering. Thus, as a preliminary, it should be understood that in certain types of carburetors the jet or nozzle as a whole is of relatively small size, and the jet tube especially is small in diameter, being in some instances approximately ninety-five thousandths of an inch outside diameter and seventy-five thousandths of an inch inside diameter. Consequently, the axial opening in the tube is small and the wall thereof relatively thin, a condition which imposes certain difficulties in uniting a tube of that kind in rigid fluid-tight connection with another member having a bore or passage corresponding in diameter to the bore or passage in the tube. A smooth continuation of these bores or passages is also usually desired as the flow of liquid through the small bore or passage in a two piece structure of such small dimensions is easily impeded. To produce such jets rapidly and inexpensively, and with absolute uniformity, in large quantities, I construct the jets, and practice the steps, substantially as herein shown and described and more particularly pointed out in the claims.

Thus, in the accompanying drawings, Fig. 1 is a side elevation of a completed jet, the scale in the original patent drawing being approximately full size. Fig. 2 is an enlarged side view of the jet tube, Fig. 3 a sectional view of the jet body, and Fig. 4 corresponding views of the same pieces, assembled but not united together. Fig. 5 is a sectional view longitudinally of a completed jet, greatly enlarged as compared with the actual size of the device. Fig. 6 is a sectional view of a modified form of jet, and Fig. 7 a similar view of another modification.

In producing the jet, the body 2 thereof is turned down to the desired size, and shape, from a solid bar or rod of brass by automatic screw machines. As formed, body 2 includes a hexagonal enlargement 3 for wrench engagement, a round integral boss 4 extending axially from one end of said enlargement, and a cylindrical extension 5 having screw-threads 6 thereon to permit the jet to be secured detachably to a carburetor. In the screw-machine operations, body 2 is drilled axially its full length to produce a flaring intake orifice 7 at one end, a main bore or passage 8 within extension 5, and a counterbore 9 extending through enlargement 3 and boss 4. In the counterboring operation an annular shoulder 10 is formed, preferably at a substantial distance from the outer end of boss 4 to permit one end of a jet tube 11 to abut thereagainst when inserted within counterbore 9.

Jet tube 11 is also produced by screw-machine operations, using either tubular stock, or solid rods drilled axially. These tubes are cut to a predetermined length, and the outer diameter thereof is approximately the same as counterbore 9 to fit snugly therein. The inner diameter of tube 11 is preferably the same as main bore 8 to provide a smooth continuous joint within body 2 at shoulder 10. In forming tube 11 an annular groove 12 is produced externally thereof, and the location of the groove relatively to the end of the tube is such that when the tube is inserted within counterbore 9 with the end of the tube seated against shoulder 10, said groove will be confined within boss 4. The wall of tube 11 being very thin groove 12 is made very shallow. Thus, in a tube of the small dimensions hereinbefore described the groove is only seven to ten thousandths of an inch in depth, but in producing the groove two sharp border edges or shoulders 14—14 are formed circumferentially of the tube. The groove may be approximately one-thirty-seconds of an inch wide in a tube having an outside diameter of ninety-five or one-hundred-thousandths of an inch.

Now, continuing, when tube 11 is inserted within counterbore 9 of body 2, the groove 12 in the tube is completely surrounded and enclosed by the wall of boss 4 and is also situated inwardly a given distance from the outer end of said boss. The assembled pieces are then placed within a jig or holder, and a revolving die or tool T applied to boss 4 to contract the same to a small diameter, see the dotted lines in Fig. 5. As shown, tool T has an axial opening to receive tube 11 and contains a circular die opening 13 at its end of smaller diameter than the outside diameter of boss 4, whereby the stock in the boss will be compressed and contracted from end to end when the tool is fed longitudinally of the boss, preferably while the tool, or body 2, is revolving. Accordingly, a fluid-tight joint is effectively obtained between tube 11 and boss 4, especially where the stock in the boss is crowded into the shallow groove 12 in the tube and forced against the two sharp border edges 14—14. The tube is also locked against longitudinal displacement within counterbore 9, and the tube and body are rigidly united together.

In Fig. 6 I show a jet tube 15 having a pair of shallow grooves 16—16 formed therein to permit a rigid fluid-tight joint to be made in two different places within body member 17. In this form of jet or nozzle the tube 15 forms an extension of a screw-threaded portion 18' which includes a smooth cylindrical portion 19 adapted to be compressed and contracted to smaller dimensions upon tube 15 so that the stock will be forced into both grooves 16—16 with interlocking sealing effect against the sharp border edges thereof. In Fig. 7 a similar seal and joint is shown which involves a separate end part or tip 20 having a circumferentially grooved portion 21 extending into tube 22, the cylindrical wall of which is shown compressed and contracted to smaller dimensions by a tool T, whereby part 20 is clamped rigidly within the tube with a plurality of ring-like portions of the stock crowded into circumferential grooves to seal the joint and to unite the parts rigidly together.

What I claim is:

1. The method herein described, consisting in producing a smooth bore within a cylindrical piece, in forming a shallow groove and sharp edges in a tubular member having the same diameter as said bore, in placing the grooved portion of said member within said bore, and in sleeving a compressing tool longitudinally over said cylindrical piece and contracting the stock upon said member and into said groove.

2. The method herein described, consisting in producing a smooth bore within a cylindrical piece, in forming a plurality of circumferential grooves and sharp edges in a tubular member having a neck portion of the same diameter as said bore and a circular shoulder portion of larger diameter than said bore and smaller diameter than the cross section of said cylindrical piece, in inserting said tubular member within said smooth bore, in contracting the wall of said cylindrical piece and crowding the stock thereof into said grooves and against said sharp edges of said tubular member.

In testimony whereof I affix my signature.

ALBERT J. WEATHERHEAD, Jr.